UNITED STATES PATENT OFFICE.

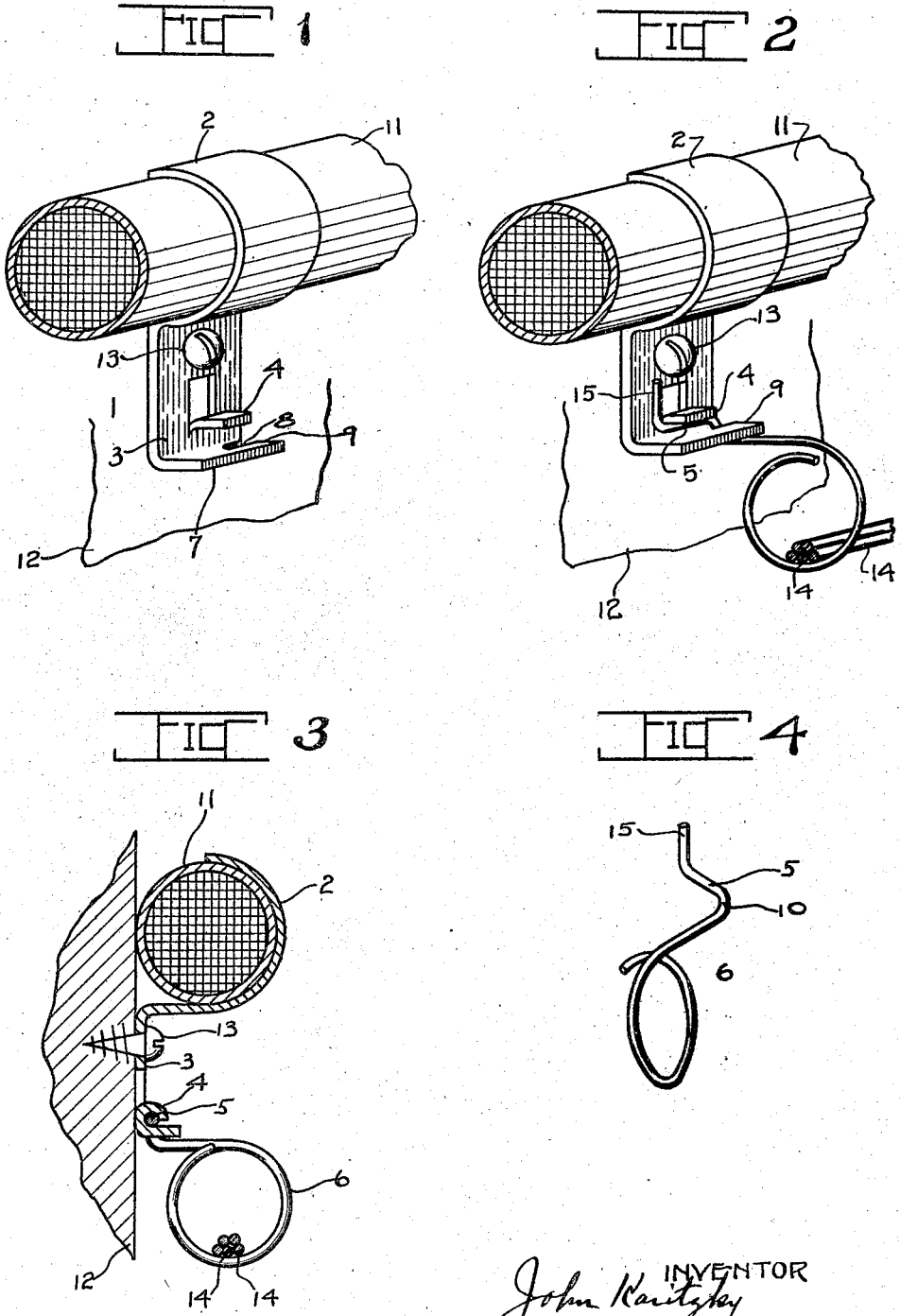

JOHN KARITZKY, OF GARWOOD, NEW JERSEY, ASSIGNOR, BY MESNE ASSIGNMENTS, TO HENRY B. NEWHALL, OF PLAINFIELD, NEW JERSEY.

CONDUIT OR CABLE CLAMP AND BRIDLE RING.

1,419,931. Specification of Letters Patent. Patented June 20, 1922.

Application filed October 14, 1920. Serial No. 416,979.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle Rings, of which the following is a specification taken in connection with the accompanying claims.

My invention relates to the combination of a conduit or cable clamp and a bridle ring, and also to a cable or conduit clamp as a sub-combination of the main combination, and as an article of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a bendable lug or tongue struck up from the base, extending above it, and adapted to be bent or peened over a portion of a bridle ring to secure the bridle ring on the exterior surface of the base.

My invention further relates to such a conduit or cable clamp provided with shoulders to cooperate with the bridle ring. Preferably these shoulders are formed by providing the base with a slotted flange, the slot in the flange and the bendable lug or tongue both cooperating to secure a bridle ring to the exterior surface of the base and prevent its rotation.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Fig. 1 is a perspective view of my conduit or cable clamp and of a cable which it supports;

Fig. 2 is a perspective view of the conduit or cable clamp shown in Fig. 1, with the addition of the bridle ring located in position and prior to being bent or peened down;

Fig. 3 is a vertical section through Fig. 2 after the bendable lug or tongue has been bent or peened down over the shank of the bridle ring;

Fig. 4 is a perspective view of the form of bridle ring which I preferably use.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2 and a base 3. This base has a struck up bendable lug or tongue 4 which extends above the base 3 and is adapted to cooperate with the shank 5 of the bridle ring 6.

I also preferably, though not necessarily, provide the conduit or cable clamp 1 with a flange 7 having a slot 8, the walls of the slot forming shoulders 9, 9 to cooperate with the bent portion 10 of the bridle ring. When the cable 11 is originally secured to the wall or other suitable support 12 by means of the conduit or cable clamp 1, and the securing screw 13, the bendable lug or tongue 4 will be substantially in the position shown in Figs. 1 and 2. Weeks, months or years later, when the telephone engineers may determine to supplement the cable 11 by stringing runs of bridle wires 14, 14, this can be easily done by bringing the bridle ring 6 adjacent to the conduit or cable clamp 1, so that the shank 5 will lie between the flange 7 and the bendable lug 4, the flange being preferably, though not necessarily, provided with a slot 8. When the flange is provided with a slot 8, the bent portion 10 of the bridle ring will become seated in the slot and cooperate with the shoulders 9, 9 as shown for example in Fig. 2. In some cases, particularly if the bridle ring is to be used only temporarily, the parts may be left in this position.

Preferably, however, the bendable lug or tongue 4 is bent or peened down with a hammer, or any other suitable instrument, as shown in Fig. 3, so as to securely hold the bridle ring to the clamp.

It will be noted that in my invention the bridle ring is secured on the exterior surface of the base 3 of the conduit or cable clamp and that the toe 15 of the bridle ring, which I preferably, though not necessarily, use bears upon the face of the base, the bridle ring not touching the wall or other suitable support 12.

It will be noted that the bridle ring can be secured on the exposed surface of the base 3 by simple manipulation without loosening or removing the securing screw 13.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion and a base, the base being provided with a flange having an open slot to form a locking shoulder to cooperate with a bridle ring, the base being also provided with a struck up bendable lug or tongue extending out from the surface of the base and adapted to be peened or bent down in the direction of the flange and over a portion of a bridle ring.

2. The combination of a conduit or cable clamp provided with a hook portion and a base, the base being provided with a flange and with a struck up bendable lug or tongue extending out from the surface of the base and adapted to be bent downward over a bridle ring and secure the bridle ring on the exterior surface of the base, and a bridle ring mounted to lie on the exterior surface of the clamp above the flange and having a portion adapted to be clamped between the flange and bendable lug or tongue by peening or bending down the lug or tongue.

JOHN KARITZKY.

Witnesses:
F. W. KARITZKY,
BERNARD C. KRAM.